Dec. 23, 1941.     C. C. HARRIS ET AL     2,267,096
HYDRAULIC TURBINE
Filed Feb. 8, 1940     2 Sheets-Sheet 1
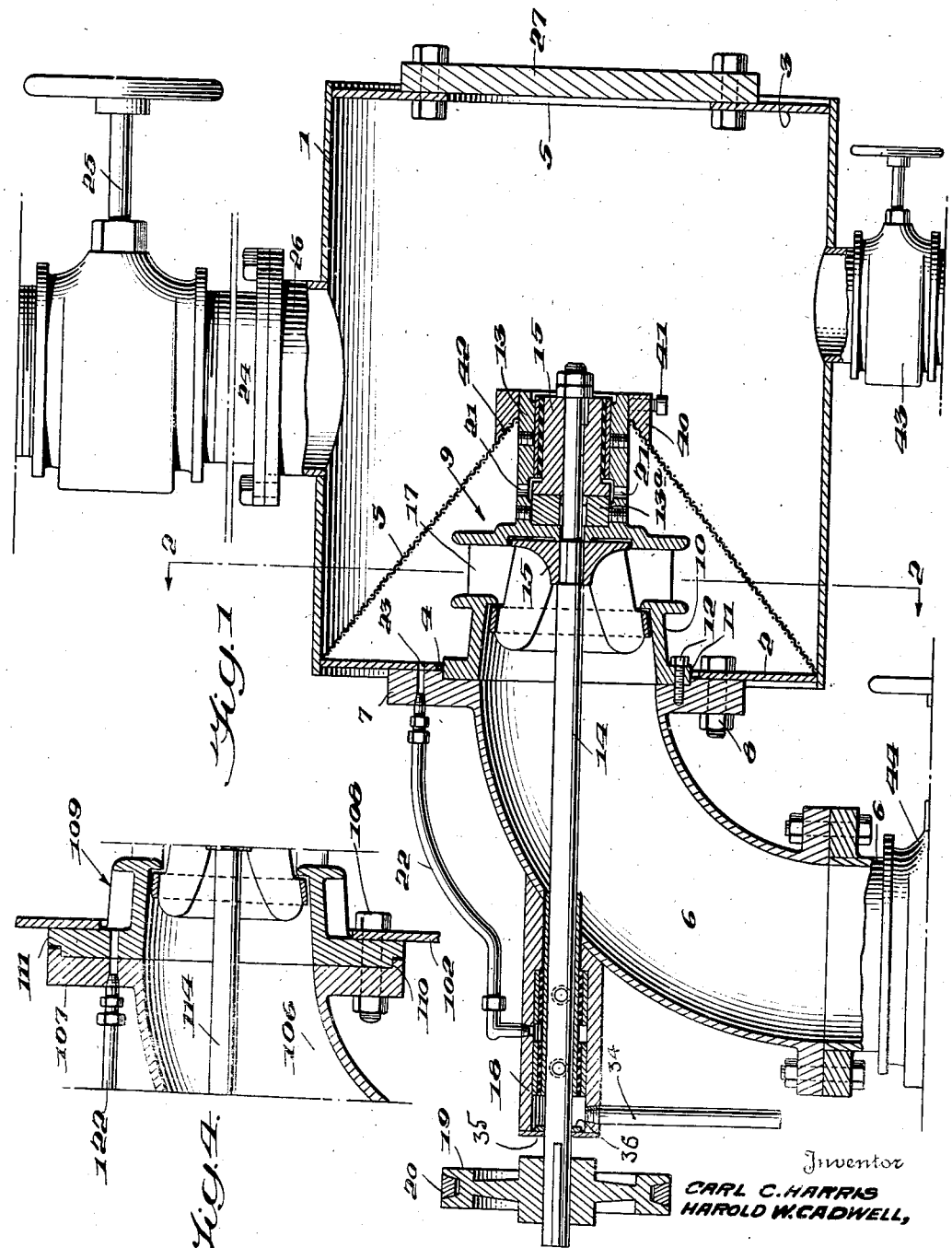
Inventor
CARL C. HARRIS
HAROLD W. CADWELL,
By Smith, Michael and Gardiner
Attorney

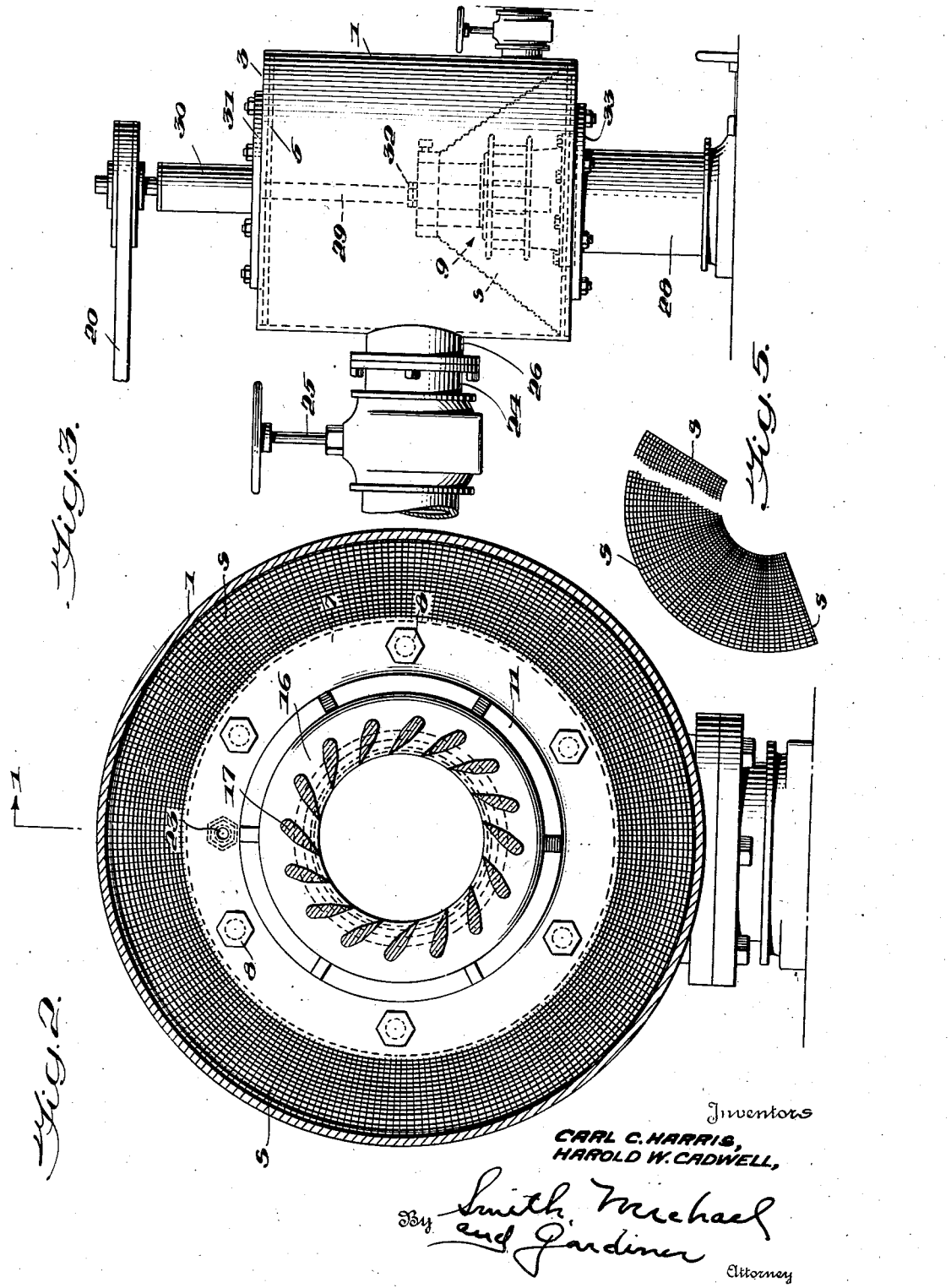

Patented Dec. 23, 1941

2,267,096

UNITED STATES PATENT OFFICE 2,267,096

HYDRAULIC TURBINE

Carl C. Harris and Harold W. Cadwell, Orange, Mass.; said Cadwell assignor to said Harris Application February 8, 1940, Serial No. 317,960

11 Claims. (Cl. 253—117)

This invention is a hydraulic turbine unit designed particularly for use in locations where the available water supply is of small volume and relatively small head, such as small suburban streams and the like.

The invention has for its object the provision of a small turbine unit which is simple in construction, efficient in operation, and which may be readily assembled and dismounted with respect to the flume casing or water supply.

Another object of the invention is to provide a small turbine unit of the character described in which the runner housing, guide vane construction and runner shaft bearing structure are combined in a single unitary assembly which includes an annular attaching flange so disposed with respect to the runner housing that the runner housing may be entered into a flume casing through an apertured wall portion thereof and said attaching flange operatively associated with a cooperating flange on a discharge fitting for joint support therewith from the apertured wall of the flume casing.

Another object of the invention is to provide in a turbine of the character described a unitary assembly which may be mounted upon a suitable discharge conduit or fitting so that the entire unit, when supported from said fitting, may be readily inserted within and withdrawn from a flume casing through an aperture about which the discharge fitting is secured when in operation.

Another object of the invention is to provide in a hydraulic turbine of the character described, a quarter turn flanged discharge conduit which may support the entire turbine unit, and in which a bearing is provided for supporting the free end of the runner shaft.

In a modified form of the invention the free end of the shaft may be supported by a bearing structure carried by a closure plate associated with an aperture in the flume casing aligned with the discharge aperture thereof.

Another object of the invention is to provide in a small turbine unit of the character described, stationary guide vanes, integral with the runner casing and inboard shaft bearing, and to control admission of water to the unit by means of a valved inlet fitting attached to the flume casing.

Another object of the invention is to provide a screen within the flume casing and surrounding the guide vanes to prevent debris entering the flume casing from fouling the water passages in the runner housing or runner.

Another object of the invention is to provide a novel form of collapsible screen which may be readily mounted within the flume casing and removed therefrom through a suitably provided aperture in the flume casing.

Another object of the invention is to provide means for readily cleaning the screen while in place.

Another object of the invention is to provide for lubricating the outboard bearing of the runner shaft with water from the flume casing and to provide means for regulating the pressure within the said bearing to prevent leakage of water therefrom.

These and other objects of the invention will become apparent upon reading the following specification in connection with the attached drawings, wherein we have illustrated preferred forms of our invention.

Referring more particularly to the drawings:

Figure 1 is a side elevation partly in section showing the unit attached to the flume casing.

Fig. 2 is a sectional view taken on the line 2—2 of Fig. 1.

Fig. 3 shows the invention in slightly modified form.

Fig. 4 is a fragmental view partly in section showing a modified form of attaching flange for the turbine unit and discharge fitting.

Fig. 5 is a fragmental plan view of the collapsible screen before insertion in the flume casing.

In the accompanying drawings like reference numerals are used to designate like parts throughout.

In Fig. 1 the reference character 1 indicates a flume casing of preferred form, the casing comprising a preferably cylindrical shell or drum having end closure members 2 and 3. The end members 2 and 3 are centrally apertured as at 4 and 5, respectively, said apertures being aligned with each other and disposed on the longitudinal axis of the casing 1. It is to be noted that while we have indicated a preference as to the cylindrical form of the casing 1, this is not essential and the casing may take any form convenient or desirable. Thus, the casing 1 may conveniently be a barrel or keg provided with suitable fittings in accordance with the following description.

As previously stated, the invention comprehends a small turbine unit which together with a discharge conduit or fitting may be jointly supported by or attached to the casing 1. Thus, in the form of our invention shown in Fig. 1, a discharge fitting 6 is provided, which fitting is shown as a quarter-turn conduit provided with an attaching flange 7 by which the fitting may be secured to the end plate 2 of the casing 1 by bolts 8 or the like. It will be noted that the flange 7 is considerably greater in diameter than the aperture 4 in the end wall 2 of the casing 1 so that an appreciable portion of the flange 7 is exposed through said aperture 4 within the casing 1. This portion of the flange 7 which is thus exposed provides means for attaching the turbine unit indicated generally by the reference numeral 9, whereby the fitting 6 and the turbine unit 9 may be jointly supported from the flume casing.

The turbine unit 9 comprises a runner housing indicated generally by the reference character 10, said housing having at one end an attaching flange 11 which, in accordance with that form of our invention shown in Fig. 1, may be secured by stud bolts 12, or any other convenient means, to the exposed portion of the fitting flange 7. The runner housing 10 supports at its opposite end a suitable bearing structure 13 for supporting one end of the runner shaft 14, as clearly shown in Fig. 1. The bearing structure 13 includes a thrust bearing 13ª of conventional form.

Mounted upon the runner shaft 14 is a runner element 15 shown in this instance as a Francis type runner, but it will be understood that any type of reaction or impulse wheel may be provided as the demands of the installation and the character of the available water supply may dictate. The runner housing 10 is provided with suitable water inlet passages 16 (see Fig. 2), said passages being defined by stationary guide vanes 17. The opposite end of the runner shaft 14 is suitably journaled in a bearing structure 18 supported by the fitting 6, the shaft 14 extending through said bearing and being provided at its free end with a drive pulley 19 which, by means of a belt 20, may be connected to drive a generator or any other suitable machine, not shown.

The bearing members 13 and 18 may be of any convenient or desired form but it is preferred to use Goodrich Cutless rubber type bearings which may be conveniently lubricated by the water from the flume casing 1. To this end, the bearing member 13 is provided with water lubricating passages 21 and the bearing 18 may be lubricated by water supplied by a pipe or conduit 22 communicating with said bearing and with the interior of the flume casing 1 by means of a suitably provided duct 23, extending through the flange and casing wall 2.

Water to drive the runner 15 of the turbine unit as just described is supplied to the casing 1 through a pipe 24 communicating with the source of water supply, said pipe being provided with a control valve 25 for regulating the amount of water supplied to the unit. The casing 1 may be provided with a suitable flanged nipple 26 by which the pipe 24 may be conveniently attached thereto.

In Fig. 1 the aperture 5 in the end wall 3 of the casing 1 is shown enclosed by a suitable blind flange or plate 27, but the aperture 5 provides means for arranging the unit in a slightly different form than that shown in Fig. 1, as well as providing means for the ready assembling and removing of the collapsible screen member S, which will be referred to more particularly hereinafter. Thus, in Fig. 3 the casing 1' has been arranged on a vertical axis instead of a horizontal axis as is the case in Fig. 1, and the quarter-turn discharge fitting 6 has been replaced by a straight discharge fitting 28. The free or outboard end of the runner shaft 29 in Fig. 3 has been extended upwardly from the turbine unit 9 and through the aperture 5 in the wall 3 of the casing 1 and is journalled in a suitable bearing member 30 supported by a closure plate 31 associated with the apertured wall 3. By this arrangement, the inlet pipe 24 may be brought into the casing 1 horizontally, and the drive belt 20 may be arranged to operate in a horizontal plane in contradistinction to the vertical disposition of the drive belt 20 in Fig. 1. In this construction it will be understood that that portion of the drive shaft 29 between the turbine unit 9 and the free end of the shaft may conveniently be of slightly less diameter than that portion of the shaft within the turbine unit in order to facilitate assembly of the locking nuts 32 by which the runner and shaft are positioned with reference to the runner housing and guide vane structure. It will be appreciated, however, that otherwise, the modification shown in Fig. 3 is characterized by the same advantageous structural features as is the modification shown in Fig. 1, and that the turbine assembly as a unit may be secured upon the attaching flange 33 of the discharge pipe 28 in the same manner as the unit shown in Fig. 1 is attached to the flange 7 of the quarter-turn discharge fitting 6.

It will also be understood that in the arrangement shown in Fig. 1, the closure plate 27, when removed, provides ready access through the aperture 5 for adjustment of the unit 9 or for installing or removing the screen unit S. The screen unit S, as shown in Fig. 5 is cut from a fabricated or perforated, resilient metal such as brass or bronze and in a manner such that when the edges s—s are brought in overlapping relationship the screen assumes the form of a section of a cone, as shown in Figs. 1 and 2. We have devised novel means for supporting the screen within the flume casing and surrounding the turbine unit in a manner to effectively inhibit the entrance into the wheel of all debris which might enter the flume casing through the inlet valve 25. Thus, we provide a collar 40 adjustably mounted upon the outer surface of the bearing member 13 and secured in position thereon by a suitable set screw 41. The collar 40 is provided with an inclined annular shoulder 42 facing towards the turbine unit 9. In mounting the screen within the flume casing the plate 27 is removed and the screen rolled sufficiently to pass through the aperture 5 of the wall 3. The screen is then permitted to expand due to its own resiliency and to assume a substantially conical form of a size such that the base of the cone coincides substantially with and fits within the line of juncture between the end plate 2 and the cylindrical wall 1 of the casing while the upper or small end of the screen is confined within the inclined shoulder 42 of the collar 40. It is apparent that by this construction, the collar 40 may be urged towards the wall 2 of the flume casing to crowd the screen against the wall 2 and when secured in this position by the set screw 41, the screen S is retained rigidly in position to completely enclose the water inlets to the runner housing.

When it is desired to clean the screen without dismantling the unit or removal of the plate 27, we provide means in the valve members 43 and 44 located respectively in the lower part of the flume casing and the draft tube, by means of which the screen may be effectively flushed. Thus, by closing the valve 44 and opening the valve 43 it is apparent that the entire volume of water entering the flume casing will be discharged through the valve 43. This arrangement of valves for cleaning the screen effectively prevents passage through the screen of debris collected thereon by means of the water which is trapped between the screen and the valve 44, and substantially all of the material clinging to the screen will be flushed from the screen and pass out of the waste discharge valve 43.

It is desired to emphasize that the use of water lubricated bearings such as indicated at 13 and 18 precludes the necessity of oil or grease as a lubricant. Furthermore, the water lubricated bearing 18 carried by the fitting 6, as shown in Fig. 1, has the added function of providing a bleed between the flume casing 1 and the discharge fitting or draft tube structure 6 bypassing the runner. It has been found that bleeding water from the bearing 8 into the discharge fitting 6 functions to steady the operation of the runner and to prevent sudden variations in speed of the runner which sometimes characterize the operation of small water driven turbine units not provided with such bleed means.

Due to the fact that the entire pressure head existing in the flume casing is present in the bearing 18 by reason of its connection with the flume casing by the conduit 22, we provide means for relieving the pressure within the bearing 18 in order to preclude leakage from the bearing around the free end of the shaft 14. Thus, a drain pipe 34 is provided to relieve the pressure within the bearing and at the same time bleed a substantial part of the water used in lubricating the bearing, to waste. It will be understood, of course, that due to the suction existing in the discharge fitting 6, a small amount of water is continually fed along the shaft into the discharge fitting 6 and it is this water bleeding into the fitting 6 on the discharge side of the runner which functions to steady the operation of the runner as previously referred to. The outboard end of the bearing member 18 is closed by a plate 35 and cooperating with the plate 35 is a slinger ring 36 which is maintained in contact with the plate 35 by the pressure existing within the bearing 18. We have found that by the use of the slinger ring 36 together with the discharge pipe 34, leakage of water through the end of the bearing 18 is effectively prevented.

In Fig. 4 we have indicated a slightly modified form of the invention wherein the turbine unit 109 (otherwise identical to that shown in Figs. 1 and 2) is provided with an attaching flange 111 substantially equal in diameter to that of the attaching flange 107 of the discharge fitting 106. By this construction the flanges 107 and 111 may be secured in superposed relation upon the end wall 102 of the flume casing by a series of bolt members 108. Thus, the second set of bolts, such as indicated at 12 in Fig. 1 and by which the turbine unit 9 is secured to the flange 11, is eliminated, and the turbine unit and discharge fitting supported bodily from the end wall 102 of the flume casing by a single set of bolts indicated at 108 in Fig. 4. If desired, flanges 107 and 111 may be provided with interfitting features such as shown at 110, whereby the flanges may be conveniently retained in coaxial relationship during assembly. It will be understood, of course, that the discharge fitting 106, as shown in Fig. 4, carries a bearing for supporting the outer end of the runner shaft 114, similar in all respects to the bearing 18 carried by the fitting 6 as shown in Fig. 1, and that such bearing is supplied with water for lubricating purposes by the pipe 122 communicating with the flume casing by means of the duct 123. It will be understood, of course, that the turbine unit 109 of Fig. 4 may have associated therewith a screen member such as the screen shown in Fig. 1. The discharge fitting 106 is similar in all respects to the discharge fitting 6 shown in Fig. 1 except the modified flange construction 107 previously referred to.

In conclusion, it will be understood that while we have here illustrated certain preferred forms of our invention, such illustration is but for the purpose of example only and we reserve the right to make such changes in size and proportion of parts as fairly fall within the scope of the appended claims. Thus, while we have shown the screen member S as made from screen wire of heavy gauge, it is to be understood that the screen may, if desired, be made of perforated resilient sheet metal without departing from the spirit of the invention.

Having thus described the invention, what is claimed as new is:

1. A hydraulic turbine unit comprising a flume casing having an aperture in a wall exteriorly thereof, a flanged discharge conduit secured to the wall of the casing about said aperture with a portion of said flange extending peripherally over said aperture to define an inner, turbine-supporting structure, and a turbine unit mounted upon that portion of the flange exposed through said aperture within the flume casing, said turbine unit and said aperture being relatively dimensioned so that the turbine unit attached to said flange may be passed freely through the aperture when the discharge conduit is detached from the flume casing.

2. A hydraulic turbine unit comprising a flume casing having an aperture in a wall thereof, a flanged discharge conduit secured to the wall of the casing about said aperture with a portion of said flange extending peripherally over said aperture to define a turbine supporting structure, a turbine unit mounted upon that portion of the flange exposed through said aperture within the flume casing, and a valve controlled inlet to said flume casing constituting the sole means for controlling admission of water to the turbine unit.

3. A turbine unit for use with a flume casing having an apertured wall comprising a discharge conduit having a flange, a turbine mounted upon said flange, said turbine including a runner and shaft, and having an overall dimension transversely of the runner shaft less than that of the aperture in said flume casing, and a bearing member carried by the discharge conduit and supporting one end of the turbine shaft, said flange being dimensioned to extend outwardly beyond the turbine unit in a plane transverse to the shaft thereof to provide means for attaching said discharge conduit and attached turbine unit exteriorly to the wall of the flume casing with the turbine extending through said aperture and disposed within the casing.

4. A turbine unit comprising a unitary runner casing, shaft bearing and guide vane assembly, a runner shaft having one end mounted for rotation within said bearing, a runner mounted on said shaft within the runner housing, said runner housing having an annular supporting flange, a flanged one quarter-turn discharge conduit, means for securing the supporting flange of the runner housing to the flange of the discharge conduit, and bearing means carried by the discharge conduit for supporting the opposite end of the shaft.

5. A turbine unit comprising a flume casing having aligned apertures, a flanged discharge conduit attached to said flume casing exteriorly thereof and in a position enclosing one of said apertures, a turbine unit supported upon said flange and disposed within said flume casing, said turbine unit including a runner shaft, one end of which is supported by said unit and the other end of which extends exteriorly of the casing, a closure for said second aperture, and means for supporting said exterior shaft end, said last-mentioned shaft supporting means comprising a bearing structure carried by the closure for said second aperture.

6. A hydraulic turbine unit comprising a flume casing having an aperture in a wall thereof, a flanged discharge conduit secured to the wall of the casing exteriorly thereof and about said aperture with a portion of said flange extending peripherally over said aperture to define an inner turbine-supporting structure, a turbine unit mounted upon that portion of the flange exposed through said aperture within the flume casing, said turbine unit including a runner shaft, means for supporting one end of the shaft within said turbine unit, means for supporting the opposite end of the shaft in said conduit, and means for lubricating both bearings by means of water from within the flume casing.

7. A hydraulic turbine unit comprising a flume casing having an aperture in a wall thereof, a flanged discharge conduit secured to the wall exteriorly of the casing and about said aperture with a portion of said flange extending peripherally over said aperture to define an inner turbine supporting structure, a turbine unit mounted upon that portion of the flange exposed through said aperture within the flume casing, said turbine unit including a runner shaft, means for supporting one end of the shaft within said turbine unit, bearing means carried by the conduit for supporting the outboard end of the shaft, a water conduit bypassing the runner and extending between the flume casing and outboard bearing and being in fluid flow communication with said bearing and flume casing, and means for bleeding water from said bearing into said conduit on the discharge side of the runner.

8. A hydraulic turbine unit comprising a flume casing having an aperture in a wall thereof, a discharge conduit having an attaching flange, a turbine unit having a supporting flange, means for jointly supporting the discharge conduit and turbine unit by their respective flanges from and exteriorly of the apertured wall of the flume casing with the turbine unit disposed within the flume casing, the flanges of the discharge conduit and turbine unit being appreciably greater in diameter than the aperture in the flume casing and secured to the apertured wall of the flume casing in superposed relationship.

9. A hydraulic turbine unit comprising a flume casing having an aperture in a wall thereof, a discharge conduit having a flange, a turbine unit having a flange, means for jointly supporting the discharge conduit and turbine unit exteriorly upon the apertured wall of said flume casing with the turbine disposed within the flume casing, a water inlet provided in said flume casing, a screen disposed within the flume casing between the inlet and said discharge conduit and surrounding the turbine unit, and means for flushing the screen while in place including a valve controlling the discharge of fluid through the discharge conduit and a waste valve in the flume casing whereby, when the discharge conduit valve is closed, water entering the flume casing inlet is bypassed around the turbine unit to flush accumulation of debris upon the screen out the waste valve when the latter is opened.

10. A hydraulic turbine unit including a flume casing having an inlet passage and a quarter-turn discharge passage, a discharge conduit secured to the exterior of the flume casing about the discharge passage thereof, and a turbine unit supported entirely by the discharge conduit and extending through said discharge passage into said casing, said unit including a runner shaft, a runner, runner housing, and guide vane structure disposed within the flume casing between the inlet and outlet passages thereof, said shaft being journaled in bearing members provided in the runner housing and discharge conduit, respectively.

11. A hydraulic turbine unit including a flume casing having an inlet passage and a discharge passage, a discharge conduit secured to the flume casing about the discharge passage thereof, and a turbine unit supported entirely by the discharge conduit and including a runner, runner housing, and guide vane structure disposed within the flume casing between the inlet and outlet passages thereof, and means carried by said turbine unit within the flume casing for maintaining the screen in position with respect to the turbine, said last-mentioned means including an annular shoulder facing the discharge conduit which supports the turbine unit, and means for adjusting said shoulder on said turbine unit whereby to engage the screen member and maintain it in abutting engagement with the wall of the flume casing.

CARL C. HARRIS.
HAROLD W. CADWELL.